United States Patent Office 3,383,417
Patented May 14, 1968

3,383,417
METHOD FOR THE PREPARATION OF AMINOETHYLETHANOLAMINE
Myrl Lichtenwalter, Austin, Tex., assignor to Jefferson Chemical Company, Inc., Houston, Tex., a corporation of Delaware
No Drawing. Filed Dec. 21, 1964, Ser. No. 420,119
2 Claims. (Cl. 260—584)

ABSTRACT OF THE DISCLOSURE

Aminoethylethanolamine is obtained in preponderant yield by contacting monoethanolamine in the absence of added ammonia with a catalyst containing a major amount of nickel, copper and a minor amount of chromium oxide, manganese oxide, molybdenum oxide and/or thorium oxide at a temperature of 150° to 250° C. and a pressure of 2,000 to 4,000 p.s.i.g. correlated so as to provide for the total conversion of about 10% to 30% of the monoethanolamine.

---

This invention relates to a method for the production of a dimerized amine feed stock. More particularly, this invention relates to a method for dimerizing monoethanolamine in order to provide a high yield of 2-(2-aminoethylamino)-ethanol, hereinafter referred to as aminoethylethanolamine.

Aminoethylethanolamine is useful for a variety of purposes, such as those related to the general areas of textile treating and sequestering. In particular, aminoethylethanolamine has been used as an intermediate in the preparation of cationic textile softening agents, sequestering agents, etc. As shown, for example, by Wilkes U.S. Patent No. 2,479,657, it can also be used as a raw material for the preparation of piperazine.

Theoretically, aminoethylethanolamine could be prepared with comparative ease by reacting monoethanolamine with itself in accordance with the following equation:

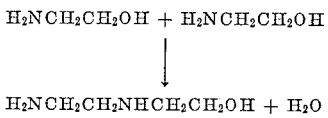

However, as shown by the Wilkes patent and other references, aminoethylethanolamine can also be converted to piperazine by the elmination of water as shown in the following equation:

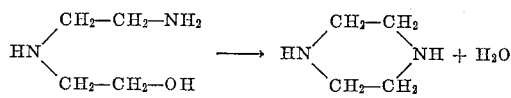

Normally, the conversion of aminoethylethanolamine to piperazine is accomplished in the presence of a hydrogenation catalyst. It is also known to prepare piperazine from monoethanolamine as shown, for example, by Moss et al. U.S. Patent No. 3,151,115 and Moss et al. U.S. Patent No. 3,037,023. Both of these conversions are normally accomplished in the presence of a hydrogenation catalyst such as a nickel, cobalt or copper hydrogenation catalyst. As a consequence, although it is known that aminoethylethanolamine is present in a by-product form when monoethanolamine is converted to piperazine, the reaction of monoethanolamine with itself over a hydrogenation catalyst has been considered a poor approach to significant production of aminoethylethanolamine because of the propensity of the product to cyclize.

It has now been surprisingly discovered, however, that monoethanolamine can be reacted with itself in the presence of a selected class of hydrogenation catalysts under reaction conditions, as hereinafter defined more fully, to provide the aliphatic dimer, aminoethylethanolamine, rather than the heterocyclic dimer, piperazine.

In general, this is accomplished when monoethanolamine is reacted with itself in the optional presence of water, but in the absence of added ammonia and in the presence of a hydrogenation catalyst, as hereafter defined, under reaction conditions including a pressure of about 2,000 to about 4,000 p.s.i.g. (composed of at least 80% of hydrogen partial pressure) at a temperature within the range of about 150° to about 250° C.; such reaction conditions being correlated to provide for an overall conversion of monoethanolamine to amine products of about 10% to about 30%. More preferably, the pressure will be composed in part primarily by hydrogen and will be within the range of about 2,500 to about 3,000 p.s.i.g., the temperature will be within the range of about 175° to about 200° C. and the conversion will be within the range of from about 20% to about 30%.

The foregoing reaction conditions may be appropriately correlated with space velocity in obtaining the desired conversion. Thus, the space velocity may suitably be within the range from about 0.4 to about 3 grams of monoethanolamine per hour per milliliter of catalyst.

The catalyst to be employed in accordance with the present invention will contain, as the active ingredient, nickel, copper and chromium oxides containing, on an oxide-free basis, from about 60 to about 85 mol percent nickel, from about 14 to about 37 mol percent copper and from about 1 to about 5 mol percent of chromium. Still more preferably, the catalyst will contain, on an oxide-free basis, 72 to 78 mol percent nickel, 20 to 25 mol percent copper and 1 to 3 mol percent chromium. A specific example of a preferred catalyst is one containing about 75% nickel oxide, about 22% copper oxide and about 3% chromium oxide. This mixture of oxides, when reduced with hydrogen at a temperature of less than about 400° C., will provide a final composition wherein the nickel and the copper oxides are reduced to metallic nickel and metallic copper but wherein the chromium oxide remains present as chromium.

Thus, chromium oxide, may be considered as a non-reducible metal oxide for the catalyst in question. It may be replaced with other non-reducible metal oxides such as manganese oxide, molybdenum oxide, thorium oxide, etc.

The invention will be further illustrated in respect to the following examples which are given by way of illustration and not as limitations on the scope of this invention.

EXAMPLE I

A series of seven one-hour runs were made by feeding monoethanolamine or a mixture of monoethanolamine and water at 3,000 p.s.i. hydrogen pressure through a reactor filled with a nickel-copper-chromia catalyst containing about 75% nickel, about 22% copper and about 2% chromium. Samples of the reactor effluent were analyzed, and the yields were determined from the analysis.

The reaction conditions employed and the results obtained are set forth in the following table.

TABLE 1

| Run No. | Feed Comp., wt. percent MEA[1] | Feed Comp., wt. percent H₂O | Space vel., g./hr./ml. | Temp., °C. | MEA Conv. | Yield, mol percent acyclic AEEA[2] | DETA[3] | EDA[4] | Total | Cyclic Pip.[5] | AEP[6] | HEP[7] | Total |
|---|---|---|---|---|---|---|---|---|---|---|---|---|---|
| 2717-7 | 80 | 20 | 2.18 | 150 | 14 | 75.5 | 0.7 | 5.8 | 82.0 | 15.7 | 1.4 | 0.9 | 18.0 |
| 2717-4 | 100 | | 1.04 | 150 | 15 | 75.5 | 0.4 | 11.9 | 87.8 | 11.6 | 0.3 | 0.3 | 12.2 |
| 2717-8 | 80 | 20 | 2.24 | 165 | 21 | 63.3 | 0.7 | 8.5 | 72.5 | 24.0 | 2.6 | 0.7 | 27.3 |
| 2717-5 | 80 | 20 | 1.01 | 168 | 30 | 50.5 | 0.6 | 8.6 | 59.7 | 30.3 | 6.6 | 3.2 | 40.1 |
| 2717-10 | 80 | 20 | 2.33 | 180 | 35 | 31.0 | 0.8 | 2.3 | 34.2 | 41.8 | 15.3 | 8.8 | 65.9 |
| 2717-6 | 80 | 20 | 1.00 | 180 | 50 | 28.6 | 3.1 | 10.4 | 42.0 | 37.5 | 9.6 | 10.7 | 57.8 |

[1] MEA=monoethanolamine.
[2] AEEA=aminoethylethanolamine.
[3] DETA=diethylenetriamine.
[4] EDA=ethylenediamine.
[5] Pip.=piperazine.
[6] AEP=N-aminoethylpiperazine.
[7] HEP=N-hydroxyethylpiperazine.

As can be seen from the foregoing table, only a minor amount of aminoethylethanolamine was obtained with conversion about 40%, the best results being obtained at conversions of 30%, or less, and still more preferably, at conversions within the range of 10% to 25%.

EXAMPLE II

A series of runs were made by passing monoethanolamine at 3,000 p.s.i. hydrogen pressure through a reactor containing a hydrogenation catalyst that differed from the catalyst in Example I only through the replacement of nickel with cobalt. Thus, the catalyst contained about 75% cobalt, about 22% copper and about 3% of chromium.

The reaction conditions employed and the results obtained are set forth in Table 2.

TABLE 2

| Run No. | Feed Comp., wt. percent MEA[1] | Feed Comp., wt. percent H₂O | Space vel., g./hr./ml. | Temp., °C. | MEA Conv. | Yield, mol percent acyclic AEEA[2] | DETA[3] | EDA[4] | Total | Cyclic Pip.[5] | AEP[6] | HEP[7] | Total |
|---|---|---|---|---|---|---|---|---|---|---|---|---|---|
| 2717-43 | 66.7 | 33.3 | 2.12 | 150 | 23 | 47.4 | 0.9 | 10.7 | 59.0 | 25.8 | 11.2 | 3.9 | 4.09 |
| 2717-46 | 66.7 | 33.3 | 0.46 | 135 | 24 | 24.1 | | 8.4 | 32.5 | 24.1 | 8.4 | 3.6 | 14.1 |
| 2717-48 | 80.0 | 20 | 1.13 | 152 | 25 | 47.8 | 1.7 | 6.1 | 55.6 | 31.0 | 8.1 | 5.2 | 44.3 |
| 2717-47 | 100.0 | | 1.07 | 153 | 26 | 45.6 | 1.1 | 8.1 | 54.8 | 28.8 | 8.9 | 7.5 | 45.5 |
| 2717-40 | 66.7 | 33.3 | 0.94 | 150 | 33 | 29.6 | | 7.8 | 34.4 | 41.2 | 11.9 | 9.5 | 62.6 |
| 2717-44 | 66.7 | 33.3 | 1.99 | 168 | 38 | 25.7 | 1.0 | 7.6 | 34.3 | 43.8 | 12.6 | 9.3 | 53.7 |
| 2717-41 | 66.7 | 33.3 | 1.15 | 165 | 53 | 12.5 | 0.9 | 5.6 | 19.0 | 51.5 | 13.4 | 10.2 | 81.1 |

[1] MEA=monoethanolamine.
[2] AEEA=aminoethylethanolamine.
[3] DETA=diethylenetriamine.
[4] EDA=ethylenediamine.
[5] Pip.=piperazine.
[6] AEP=N-aminoethylpiperazine.
[7] HEP=N-hydroxyethylpiperazine.

As will be seen from the results of this experiment, cobalt-copper-chromia catalysts exhibited a far greater tendency towards ring closure than the nickel catalyst, as is illustrated by the sum of yield of heterocyclic compounds (piperazine, hydroxyethylpiperazine and aminoethylpiperazine).

What is claimed is:

1. A method for the preparation of aminoethylethanolamine which comprises contacting monoethanolamine in the absence of added ammonia with a hydrogenation catalyst under conversion conditions within the general range of 2,000 to 4,000 p.s.i.g., a temperature of 150° C. to 250° C. and a space velocity within the range of 0.5 to 3 grams of monoethanolamine per milliliter of catalyst per hour in the presence of hydrogen, said reaction conditions being correlated to provide a conversion of monoethanolamine of from about 10% to about 30%, whereby the predominant reaction product is aminoethylethanolamine, said catalyst containing, as the active ingredient, nickel, copper and a non-reducible metal oxide in the proportions, on an oxide-free basis, of about 60 to about 85 mol percent nickel, 14 to 37 mol percent copper and 1 to 5 mol percent of the non-reducible metal oxide, said non-reducible metal oxide being selected from class consisting of chromium oxide, manganese oxide, molybdenum oxide and thorium oxide.

2. A method as in claim 1 wherein the pressure is within the range of 2,500 to 3,000 p.s.i.g., the temperature is within the range of 175° to 200° C., wherein the conversion is within the range of about 10% to about 25% and wherein the catalyst contains, on an oxide-free basis, from about 72 to 78 mol percent nickel, 20 to 25 mol percent copper and 1 to 3 mol percent chromium.

References Cited

UNITED STATES PATENTS 3,037,023    5/1962    Moss et al.    260—268
3,151,115    9/1964    Moss et al.    260—268

CHARLES B. PARKER, *Primary Examiner.*

D. R. PHILLIPS, *Assistant Examiner.*